United States Patent [19]
Levy et al.

[11] Patent Number: 5,729,948
[45] Date of Patent: Mar. 24, 1998

[54] APPARATUS AND METHOD FOR RIGIDLY JOINING CONSTRUCTION ELEMENTS TO ONE ANOTHER

[76] Inventors: Tzadok Levy, Barkan Ind. Zone P.O.B. 85, D.N. Efraim 44820; Avigdor Bentov, Hanasi St. Binyamina P.O.B. 13, Binyamina 30550, both of Israel

[21] Appl. No.: 705,431

[22] Filed: Aug. 29, 1996

[51] Int. Cl.⁶ .................................................. F16B 2/00
[52] U.S. Cl. ...................... 52/656.9; 52/653.1; 52/655.1; 52/736.2; 52/745.19; 411/57; 403/68; 403/187; 403/387; 403/388; 403/400
[58] Field of Search .................... 52/656.9, 653.1, 52/655.1, 736.2, 745.19; 403/66, 68, 400, 386, 388, 187, 188, 277, 288, 281, 384, 385, 387, 390; 411/41, 57

[56] References Cited

U.S. PATENT DOCUMENTS

| | | | |
|---|---|---|---|
| 3,385,157 | 5/1968 | Rapata | 411/41 |
| 3,415,554 | 12/1968 | Papayoti | 403/187 |
| 4,405,272 | 9/1983 | Wollar | 411/41 |
| 4,566,819 | 1/1986 | Johnston | 403/385 |
| 5,163,795 | 11/1992 | Benoit et al. | 411/41 X |
| 5,481,842 | 1/1996 | Gautreau | 52/656.9 |

FOREIGN PATENT DOCUMENTS

| | | | |
|---|---|---|---|
| 994515 | 8/1951 | France | 403/400 |
| 2142621 | 3/1973 | Germany | 403/188 |
| 3107153 | 9/1982 | Germany | 411/57 |
| 114894 | 9/1945 | Sweden | 403/388 |
| 2227053 | 7/1990 | United Kingdom | 403/400 |

*Primary Examiner*—Carl D. Friedman
*Assistant Examiner*—Laura A. Callo
*Attorney, Agent, or Firm*—Haugen and Nikolai, P.A.

[57] ABSTRACT

An apparatus and method for rigidly joining construction elements to one another based on providing construction elements each having a connecting bore formed therethrough, positioning elements each having a connecting bore formed therethrough for aligning the connecting bores of adjacent construction elements, and partially expandable locking means dimensioned to extend through the aligned connecting bores of at least two construction elements and one positioning element. The construction elements and positioning elements are further equipped with engagement grooves and engagement ribs, respectively, for positioning adjacent construction elements in any number of predetermined angles. The locking mechanism has a radially expanding portion capable of locking the previously positioned construction elements in a rigid fashion.

21 Claims, 12 Drawing Sheets

APPARATUS AND METHOD FOR RIGIDLY JOINING CONSTRUCTION ELEMENTS TO ONE ANOTHER

BACKGROUND OF THE INVENTION

I. Field of the Invention

The present invention relates generally to the art of fabricating rigid structures. More particularly, the present invention relates to an apparatus and method for rigidly joining construction elements to one another based on providing construction elements each having a connecting bore formed therethrough, positioning elements each having a connecting bore formed therethrough for aligning the connecting bores of adjacent construction elements, and partially expandable locking means dimensioned to extend through the aligned connecting bores of at least two construction elements and one positioning element. The construction elements and positioning elements are further equipped with engagement grooves and engagement ribs, respectively, for positioning adjacent construction elements in any number of predetermined angles. The locking means has a radially expanding portion capable of locking the previously positioned construction elements in rigid fashion.

II. Discussion of the Prior Art

In the art of fabricating rigid structures, individuals have for years endeavored to design and manufacture such structures using a number of different construction techniques. Generally speaking, these construction techniques involve the first step of positioning the constituent construction elements in a desired arrangement followed by the step of affixing the construction elements so as to maintain the construction elements in the desired position. The step of positioning the construction elements together can be accomplished in any number of different fashions, including manual and/or automated positioning, and typically requires a fair degree of precision to ensure for the proper alignment of the constituent construction elements. The step of affixing the construction elements in relation to one another has typically been accomplished via the use of such affixing implements as glue, nails, screws, bolts, etc . . . to maintain the construction elements in a fixed and desired arrangement. While the use of such affixing implements is generally effective in producing rigidly constructed structures, several disadvantages exist with the use of such affixing implements which, as will be described in greater detail below, creates a need for an improved construction technique for rigidly joining construction elements to one another.

With initial regard to the use of glue as an affixing implement, this technique is flawed for several significant reasons. First, the use of glue to affix construction elements is disadvantageous in that it is typically quite messy to work with, oftentimes smearing and/or running during the application and positioning stages of construction. Such smearing and/or running may stain or otherwise mar the outward appearance of the construction elements which, it follows, may require a substantial amount of time and energy to remove the smeared glue from the construction elements and/or repair any discoloring or marring experienced on the outer surfaces of the construction elements. This, of course, adds to the total cost of constructing the particular structure in terms of the extra labor and materials required to restore the construction elements to their original and untainted state.

Various other disadvantages may result depending upon the type of glue being used during construction. More particularly, the use of fast drying glue leaves little time between the application of the glue to the construction elements and the positioning of the construction elements in the desired arrangement. Such a time constraint is disadvantageous in that it can lead to misalignment of the construction elements in the rush to position the construction elements before the glue cures and becomes unmanageable. Those skilled in the art will recognize that such misalignment may result in having to forcibly dismantle the previously affixed construction elements to remove the glue residue, reapply the glue, and reposition the construction elements in the proper arrangement. Worse yet, the misaligned construction elements may have to be discarded in the instance that the forcible dismantling irreparably damages the construction elements. The use of slow drying glue minimizes the time constraint associated with the use of fast drying glue and, thus, reduces the incidence of having to forcibly dismantle the construction elements after curing. However, a drawback nonetheless exists with slow drying glue in that various clamping mechanisms and/or braces are typically required to maintain the construction elements in the proper position during the more lengthy curing period. This, once again, may add to the overall cost of constructing the rigid structure, both in terms of the time required to apply and remove the various clamps and braces to and from the construction elements, as well as the extra cost associated with the clamps and braces.

Yet another disadvantage of using glue as an affixing agent is the relative inability to recycle the construction elements after they have been cured in a particular arrangement. As noted above, if fast drying glue cures with the construction elements in a misaligned state it may be necessary to discard the construction elements or, at the very least, spend a substantial amount of time reconditioning the construction elements for eventual reuse. This same problem holds true regardless of the type of glue employed if it is later desired to recycle and rearrange the constituent construction elements of a particular structure to build a new and different structure. This effectively limits the ability to recycle the construction elements which, it will be appreciated, is disadvantageous from the standpoint of increased cost and reduced versatility. Cost is effectively increased by eliminating the potential to recycle, thus requiring increased expenditures in the instance that the new structures are desired. Reduced versatility results in that the glue, once cured, is particularly troublesome and expensive to remove from an article making it difficult to justify reconditioning the construction elements for reuse.

A host of significant drawbacks also accompany the use of nails, bolts, screws and the like as affixing implements in constructing rigid structures. Premier among these drawbacks is the fact that these types of fasteners all require the use of supplemental tools for introducing them into and/or through the particular construction elements. For example, the use of nails requires a hammer for driving nails into a particular construction element, the use of bolts requires a drill for boring a hole through the construction element and at least one wrench for tightening a nut on the bolt, and the use of screws requires a screwdriver for driving the screw into the construction element. As such, the cost of undertaking the construction of a structure automatically includes the extra overhead associated with acquiring or renting the requisite tools. The requirement for supplemental tools also is disadvantageous from the standpoint of ease of use in that one must always have tools accompanying them in order to effectively assemble a rigid structure. This may be particularly troublesome when attempting to build rigid structures in remote locations, such as a constructing a stand or blind for use in hunting, which may require assembly in the precarious environment of a tree. Finally, the requirement of supplemental tools is a further disadvantage in that the use of such tools increases the amount of time required to construct a rigid structure. For example, the extra step of drilling a bore through the construction elements when using bolts adds to the overall assembly time which, when dealing with a large structure, may translate into a substantial increase in the cost of labor.

Contrary to the use of glue, the use of nails, screws, bolts, and the like as affixing implements does allow for the disassembly of the constituent construction elements in order to readily reposition and/or recycle the construction elements. Notwithstanding this apparent benefit over the use of glue, a significant drawback still exists in that the use of screws, nails, bolts, and the like necessarily requires a hole to be created in the construction elements to house the particular fasteners. This may be problematic for a variety of reasons, not the least of which is the marring of the aesthetic appearance of the particular construction elements. While it is possible to fill in the holes created by the removal of these fasteners with putty and the like, such refurbishing activities can be quite time consuming and expensive and thus are not particularly attractive.

A need therefore exists for a device and method for rigidly joining construction elements to one another which overcomes the aforementioned deficiencies in the prior art. To be more specific, a device and method for rigidly joining construction elements to one another is required which is quick and easy to work with and manipulate, requiring no supplemental tools, clamps, or braces for assembly and/or disassembly. The device and method should be capable of rigidly joining the various construction elements without damaging or marring the aesthetic appearance of the construction elements. The device and method should further be capable of rigidly joining construction elements together in one of a variety of predetermined angles and configurations so as to eliminate the need for precise manual positioning and to reduce the likelihood of misalignment. The improved device and method should also include the use of resilient components which are capable of being reused, recycled, and repositioned without damaging the structural integrity thereof. Moreover, a need exists for a device and method capable of rigidly joining construction elements to one another which is versatile and capable of constructing a multitude of different rigid structures with minimal time investment.

SUMMARY OF THE INVENTION

It is accordingly a principal object of the present invention to provide an apparatus and method for rigidly joining construction elements to one another which is quick and easy to work with and manipulate, requiring no supplemental tools, clamps, or braces for assembly and/or disassembly.

It is a further object of the present invention to provide an apparatus and method for rigidly joining construction elements to one another which does not damage or mar the aesthetic appearance of the construction elements.

It is still another object of the present invention to provide an apparatus and method for rigidly joining construction elements to one another which is capable of joining the construction elements together in one of a variety of predetermined angles and configurations so as to eliminate the need for precise manual positioning and to reduce the likelihood of misalignment.

It is a still further object of the present invention to provide an apparatus and method for rigidly joining construction elements to one another which uses resilient components capable of being reused, recycled, and repositioned without damaging the structural integrity thereof.

It is yet another object of the present invention to provide an apparatus and method for rigidly joining construction elements to one another which is versatile, allowing a person to construct any number of different rigid structures with minimal time investment.

In accordance with the present invention, the foregoing objects and advantages are achieved by providing a system for rigidly joining a first construction element to a second construction element, comprising a first construction element and a second construction element each having a connecting bore formed therethrough, a first pair of engagement grooves extending laterally away from a first end of the connecting bore, and a second pair of engagement grooves extending laterally away from a second end of the connecting bore. Positioning means are provided for positioning the first construction element relative to the second construction element. The positioning means has a connecting bore formed therethrough, a first pair of engagement ribs extending laterally away from a first end of the connecting bore, and a second pair of engagement ribs extending laterally away from a second end of the connecting bore. The positioning means are disposed between the first and second construction elements such that the connecting bore of the positioning means is substantially coaxial with the connecting bores of the first and second construction elements. The second pair of engagement ribs of the positioning means are engagedly coupled with the first pair of engagement grooves of the second construction element. Partially expandable locking means are further provided for rigidly locking the first construction element relative to the second construction element. The partially expandable locking means are disposed at least partially within the connecting bore of the first construction element, at least partially within the connecting bore of the second construction element, at least partially within the connecting bore of the positioning means, and partially expanded to thereby affix the first construction element in rigid relation to the second construction element.

In accordance with another broad aspect of the present invention, the aforementioned objects are attained by providing a method for rigidly joining a first construction element to a second construction element, comprising the steps of: (a) providing a first and a second construction element, the first and second construction elements each having a connecting bore extending between a first surface and a second surface; (b) providing positioning means having a connecting bore extending between a first surface and a second surface; (c) providing partially expandable locking means for locking the first and second construction elements in fixed relation about the positioning means; (d) arranging the positioning means between the first and second construction elements such that the connecting bore of the positioning means is substantially coaxial with the connecting bore of the first construction element and the connecting bore of the second construction element; (e) arranging the locking means so as to extend at least partially within the connecting bores of the first and second construction elements and at least partially within the connecting bore of the positioning means; and (f) partially expanding the partially expandable locking means to affix the first construction element in fixed and rigid relation to the second construction element.

The foregoing features and advantages of the present invention will be readily apparent to those skilled in the art from a review of the following detailed description of the preferred embodiment in conjunction with the accompanying drawings and claims.

DETAILED DESCRIPTION OF THE PREFERRED EMBODIMENT

Figure 1:
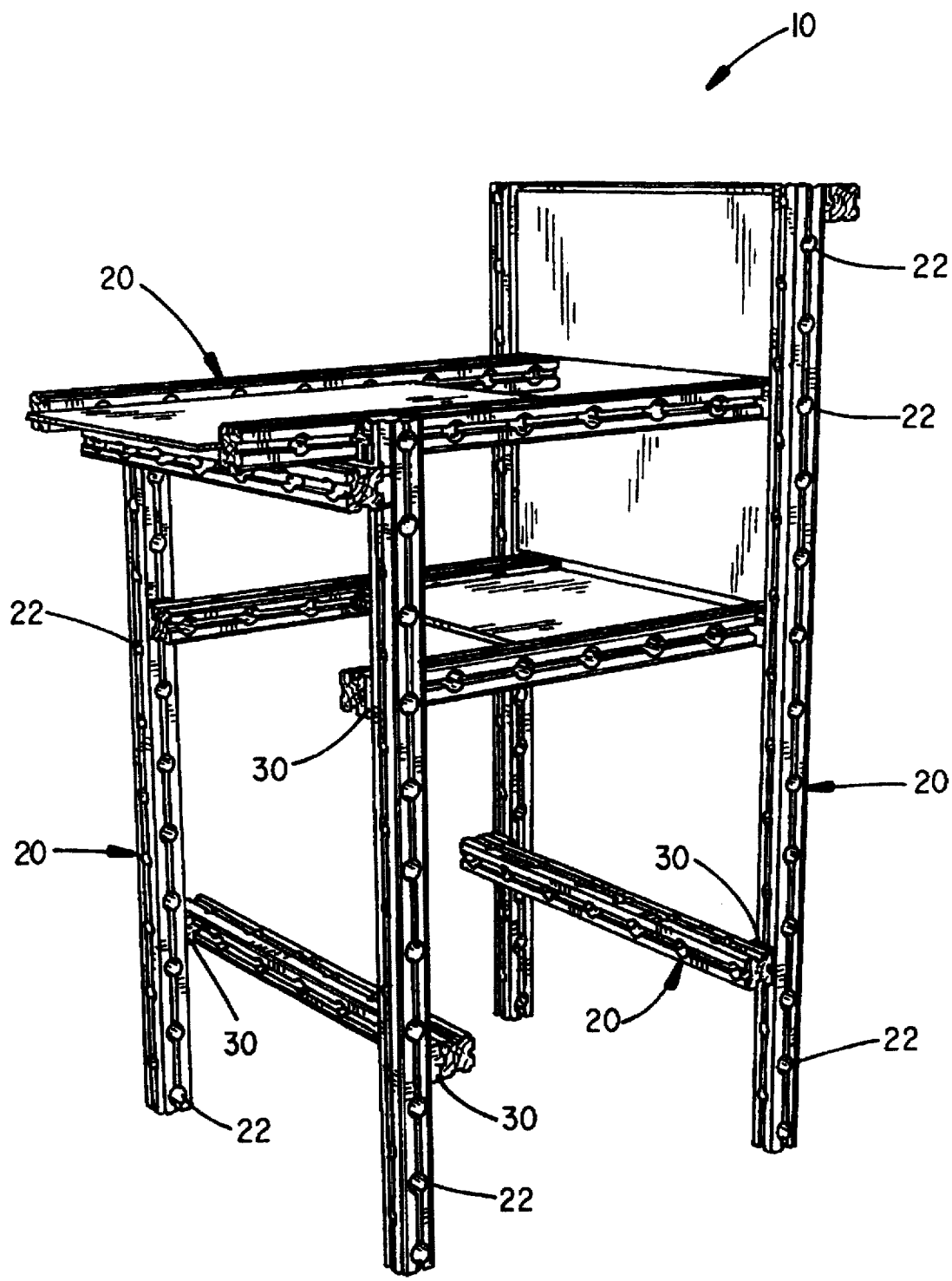
FIG. 1 is a perspective view of a child seat constructed in accordance with the improved construction system of the present invention.

Referring initially to FIG. 1, shown in perspective is an exemplary structure 10 made in accordance with improved construction system of the present invention. As will be explained in greater detail below, structure 10 is comprised of a plurality of construction elements 20 which are rigidly interconnected to one another through the use of a plurality of positioning elements 30 disposed between adjacent construction elements 20 and partially expandable locking means (not shown) extending between the adjacent construction elements 20 and the interspaced positioning elements 30. Each construction element 20 has a plurality of connecting bores 22 formed therethrough, and each positioning element 30 has a single connecting bore (not shown) formed therethrough. Each positioning element 30 is disposed between adjacent construction elements 20 such that a pair of connecting bores 22 are aligned on either side of the positioning element connecting bore (not shown). Each partially expandable locking means (not shown) is dimensioned to be received within each set of aligned connecting bores and capable of partially expanding therewithin to forcibly lock construction elements 20 in the rigid structure shown.

Figure 2:
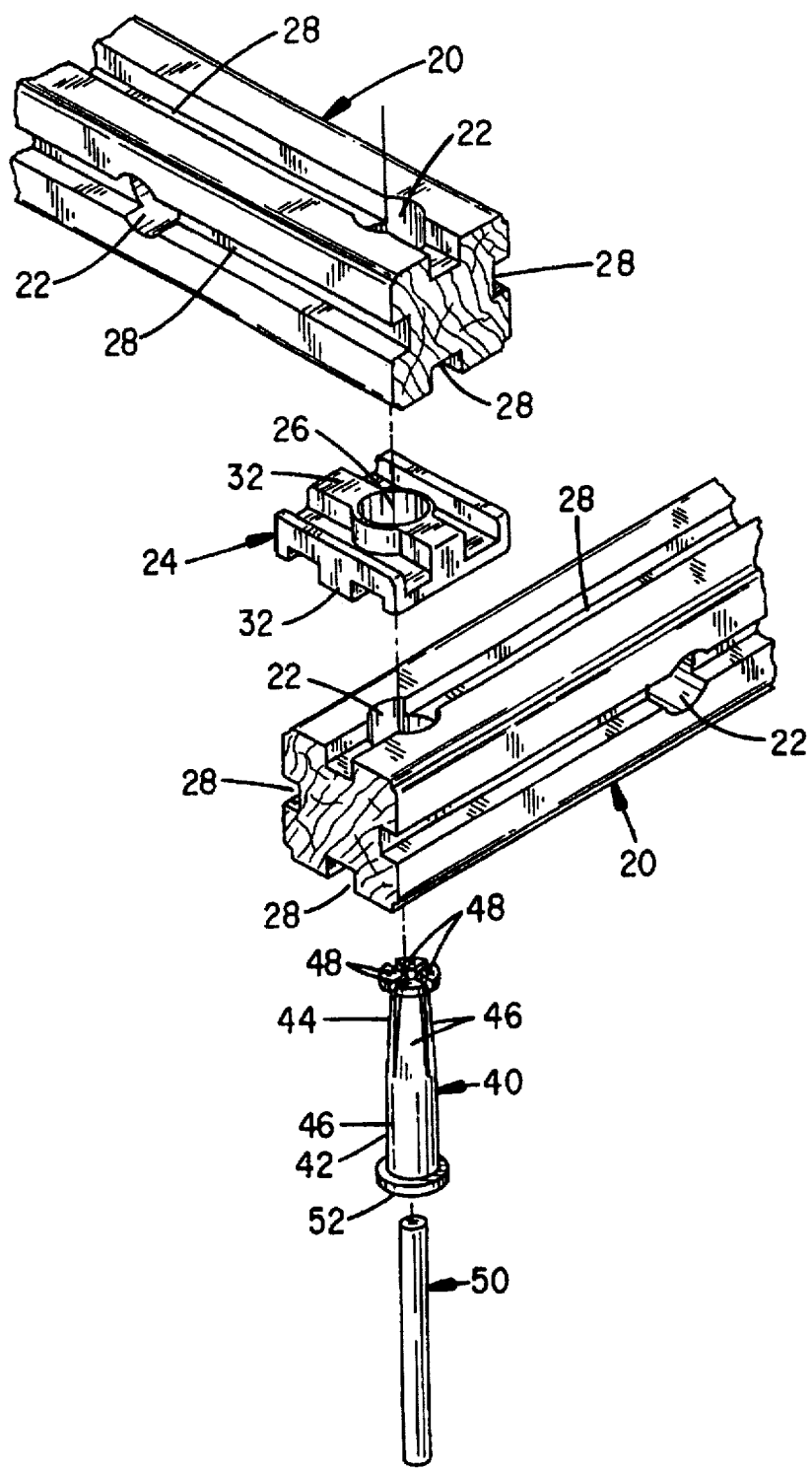
FIG. 2 is an exploded perspective view of a first preferred embodiment of the apparatus of the present invention, including a first construction element, a second construction element, a first preferred positioning element, and a partially expandable locking mechanism.
Figure 3A:
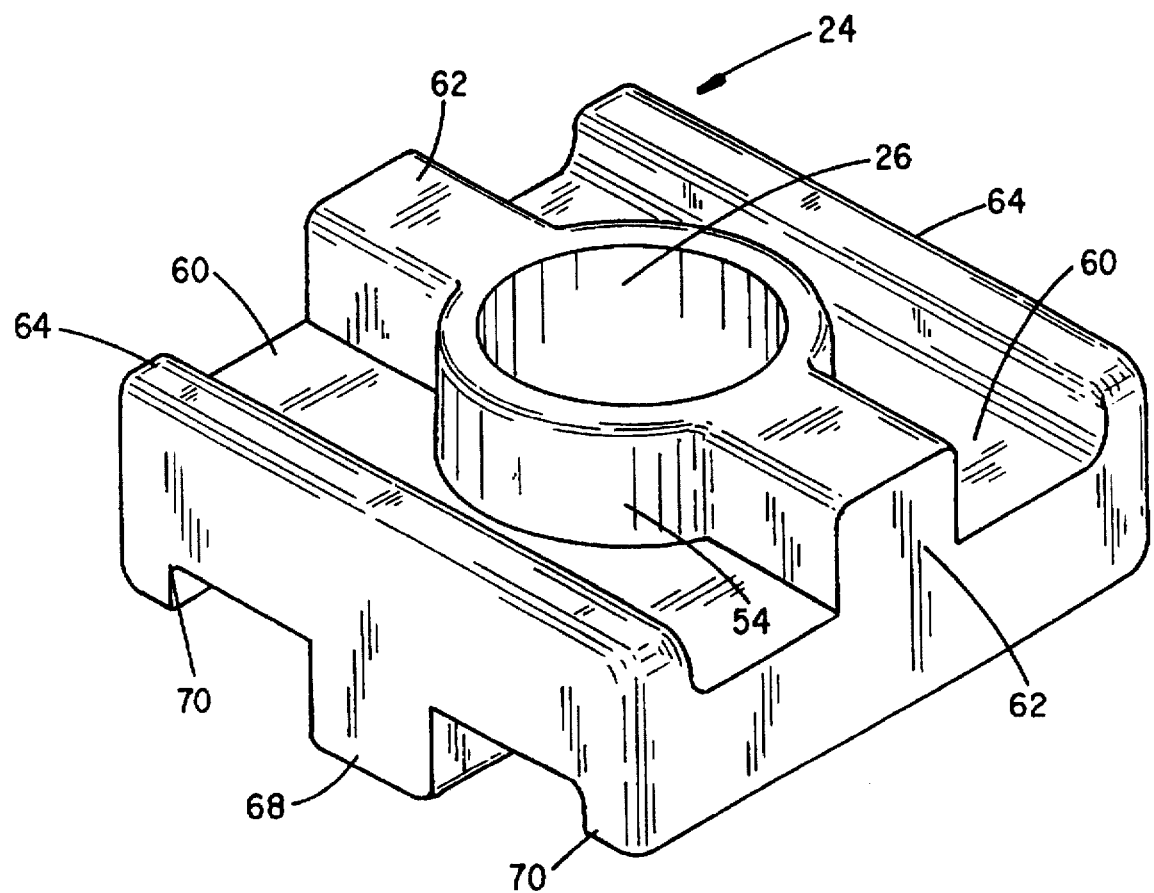
FIG. 3A is an enlarged perspective view of the positioning element shown in FIG. 2.
Figure 3B:
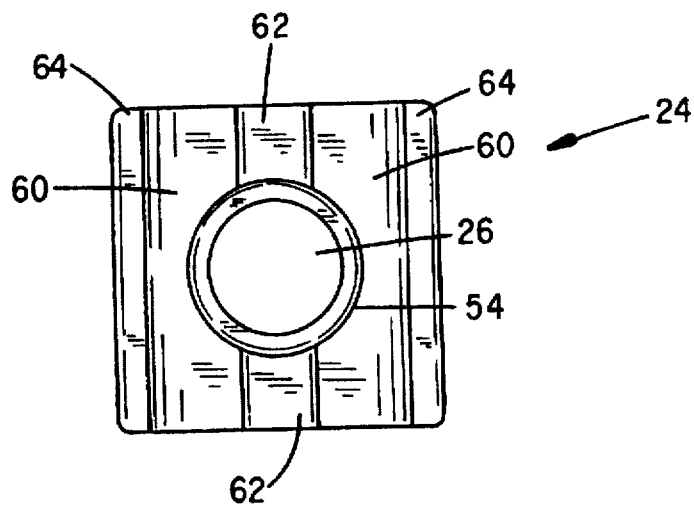
FIG. 3B is a top plan view of the positioning element shown in FIG. 3A.
Figure 3C:
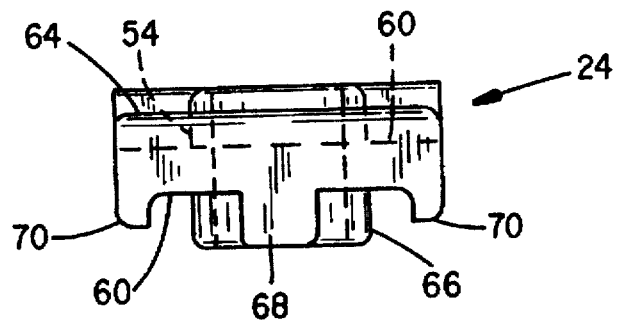
FIG. 3C is a side profile view of the positioning element shown in FIG. 3A.
Figure 3D:
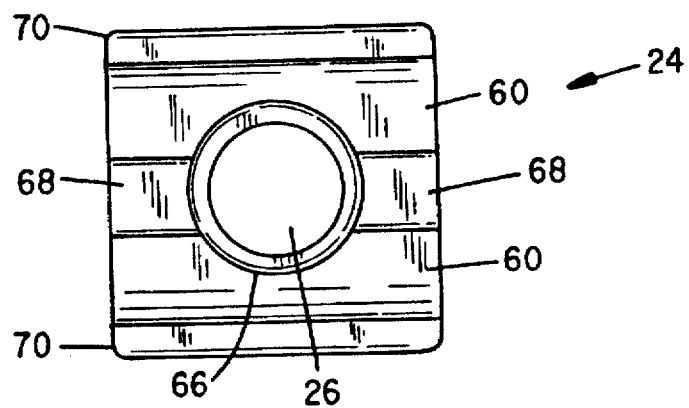
FIG. 3D is a bottom plan view of the positioning element shown in FIG. 3A.

Referring now to FIG. 2, shown is an exploded perspective view illustrating a first preferred embodiment of the improved construction system of the present invention. In its most fundamental form, the present invention includes a pair of construction elements 20 each having at least one connecting bore 22 formed therethrough, a positioning element 24 having a connecting bore 26 formed therethrough, a partially expandable tubular member 40, and a dowel member 50. As can be seen, the construction elements 20 and the positioning element 24 are further equipped with a plurality of interlocking grooves and ribs for arranging the construction elements 20 in fixed angular relation about the positioning element 24. To be more specific, each construction element 20 is formed with at least one engagement groove 28 extending laterally from the opposing ends of each connection bore 22. Positioning element 24 is similarly formed with at least one pair of engagement ribs 32 extending laterally from the opposing ends of connection bore 26. As will be discussed in greater detail below, positioning element 24 is dimensioned so as to automatically position connecting bore 26 in substantially coaxial relationship with at least one connecting bore 22 of each adjacent construction element 20 when positioning element 24 is disposed therebetween. In this regard, it is important to note that each engagement rib 32 is rigidly constructed as part of positioning element 24 and dimensioned to be snugly received within a groove 28 of construction element 20 such that the construction elements 20 will be disposed in fixed angular relation once positioning element 24 is matingly engaged between adjacent construction elements 20.

Partially expandable tubular member 40 includes a non-expanding portion 42 and an expanding portion 44. Non-expanding portion 42 extends between a lip member 52 and a plurality of flexible expansion leaves 46, and has a lumen (not shown) of substantially uniform radius extending the length thereof. Expanding portion 44 comprises the plurality of flexible expansion leaves 46 which extend between a plurality of lip members 48 and non-expanding portion 42, and an internal lumen (not shown) extending between the flexible expansion leaves 46. It is important to note that, while in the undeployed state shown in FIG. 2, each of the plurality of flexible expansion leaves 46 curves radially inward between the junction point with non-expanding portion 42 and the plurality of lip members 48 so that the external radius and internal lumen (not shown) of expanding portion 44 taper progressively inward as they approach the lip members 48. By tapering the external radius of expanding portion 44, tubular member 40 is thereby capable of being easily inserted into the coaligned connecting bores 26,24,26. Those skilled in the art will appreciate that this bougie arrangement facilitates the use of such a locking mechanism in that a person can quickly and easily insert the tubular member 40 into and out of the coaligned connecting bores 26,24,26 without requiring additional tools or other implements. By tapering the internal lumen (not shown) of expanding portion 44, expanding portion 44 is capable of easily and progressively receiving dowel member 50 therein, thereby forcing the plurality of expansion leaves 46 outward to exert radial pressure against at least a portion of the coaligned connecting bores 26,24,26. As will be discussed in greater detail below, this outward radial pressure acts also acts to engage lip members 48,52 against compression ridges disposed within each connecting bore 22 so as to draw the adjacent construction elements together.

With specific reference now to FIGS. 3A-3D, a more detailed discussion as to the construction of positioning element 24 follows below. Positioning element 24 comprises a generally planar base member 60, a first alignment barrel 54, a first pair of engagement ribs 62, a first pair of lateral support arms 64, a second alignment barrel 66, a second pair of engagement ribs 68, and a second pair of lateral support arms 70. First alignment barrel 54 is disposed in the approximate center of planar base member 60 and extends a predetermined distance from a first surface thereof. Second alignment barrel 66 is also disposed in the approximate center of planar base member 60 and extends a predetermined distance from a second surface thereof. Importantly, the respective lumens of first alignment barrel 54 and second alignment barrel 66 are coaxial and integrally connected so as to define the boundary of the aforementioned connecting bore 26. As such, fluid communication is provided between the first and second surfaces of generally planar base member 60.

The first pair of engagement ribs 62 are integrally connected to the first alignment barrel 54 and extend laterally away therefrom. The first pair of engagement ribs 62 are approximately the same height as first alignment barrel 54 and, in this particular embodiment, are disposed so as to bisect both the planar base member 60 and the first alignment barrel 54. The first pair of lateral support arms 64 are disposed laterally from and substantially parallel to the first pair of engagement ribs 62 and, once again, are the same approximate height from the first surface of planar base member 60 as the first pair of engagement ribs 62 and the first alignment barrel 54. With brief reference to FIGS. 7A and 7B, when positioning element 24 is coupled between a pair of adjacent construction elements 20, the first pair of lateral support arms 64 provides increased structural support along the edges of each of the adjacent construction elements 20 to resist any torsion or twisting forces that may act to shift the relative angular position of the adjacent construction elements 20.

Moving on to the last remaining features of positioning element 24, the second pair of engagement ribs 68 are integrally connected to second alignment barrel 66, extend laterally away therefrom, and are approximately the same height as second alignment barrel 66. As with the first pair of engagement ribs 62, the second pair of engagement ribs 68 are disposed so as to bisect both the planar base member 60 and the second alignment barrel 66. Finally, the second pair of lateral support arms 70 are disposed laterally from and substantially parallel to the second pair of engagement ribs 68. The second pair of lateral support arms 70 are the same approximate height from the second surface of planar base member 60 as the second pair of engagement ribs 68 and the second alignment barrel 66. Brief reference to FIGS. 7A and 7B again illustrates that the second pair of lateral support arms 70 provides increased structural support along the edges of each of the adjacent construction elements 20 to resist torsion and/or twisting forces which act to shift the relative angular position of the adjacent construction elements 20 when positioning element 24 is coupled between a pair of adjacent construction elements 20.

As will be appreciated from FIGS. 3A–3D, the positioning element 24 of this preferred embodiment is constructed such that the features disposed on the upper surface are essentially mirror images of the features disposed on the lower surface, except for a 90 degree shift in orientation. As such, the interlocking of adjacent construction elements via the predetermined groove and rib arrangement ensures that the construction elements will be automatically positioned perpendicular to one another. Thus, the present invention reduces the amount of time and energy required to position construction elements, thereby marking a significant improvement in terms of a reduction in labor costs, as well as material costs associated with using devices traditionally used to ensure for the proper positioning of construction elements, such as clamps, braces, and the like.

Figure 4A:
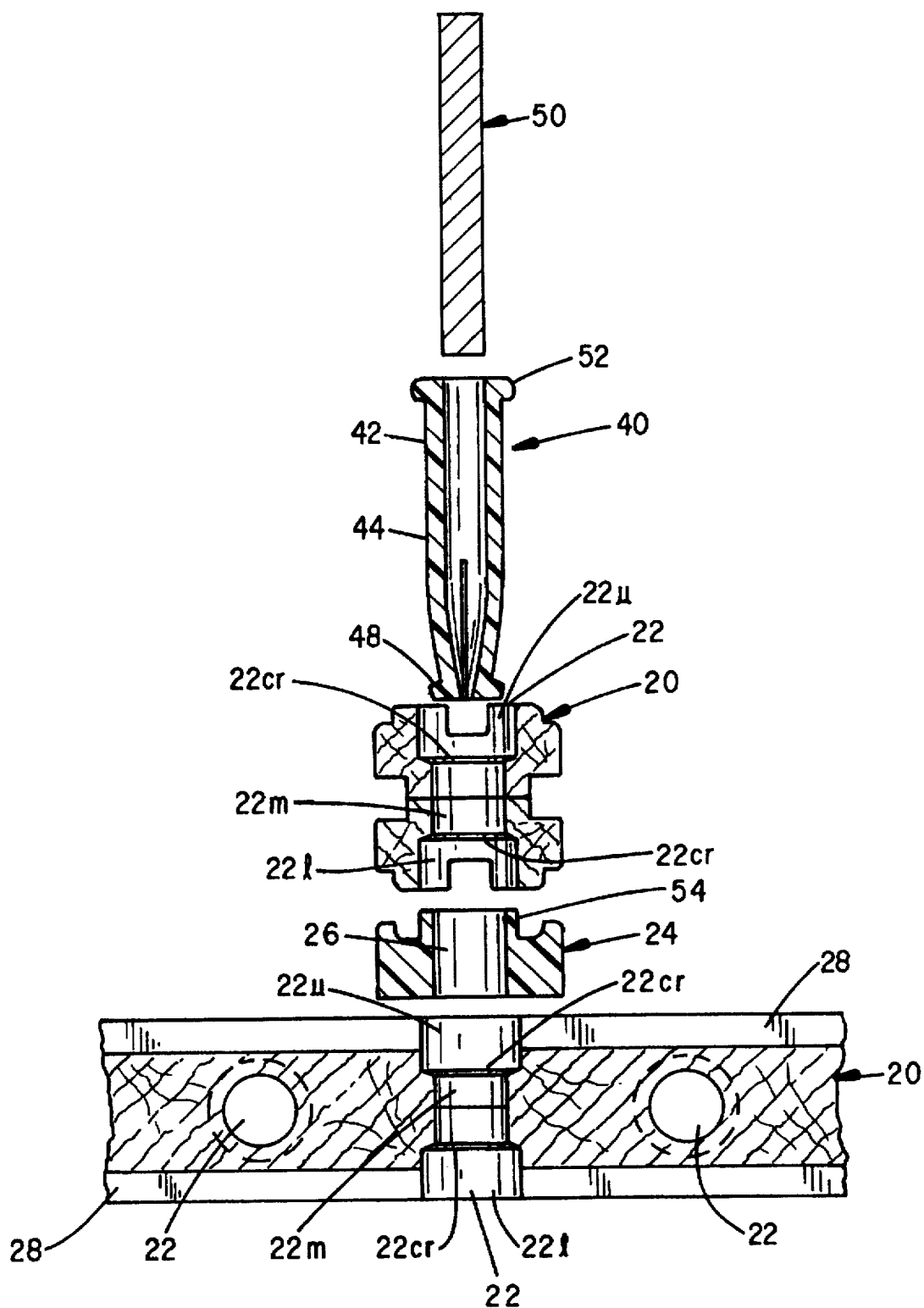
FIGS. 4A-4C are cross-sectional views illustrating the first preferred embodiment of present invention prior to, during, and after assembly, respectively.
Figure 4B:
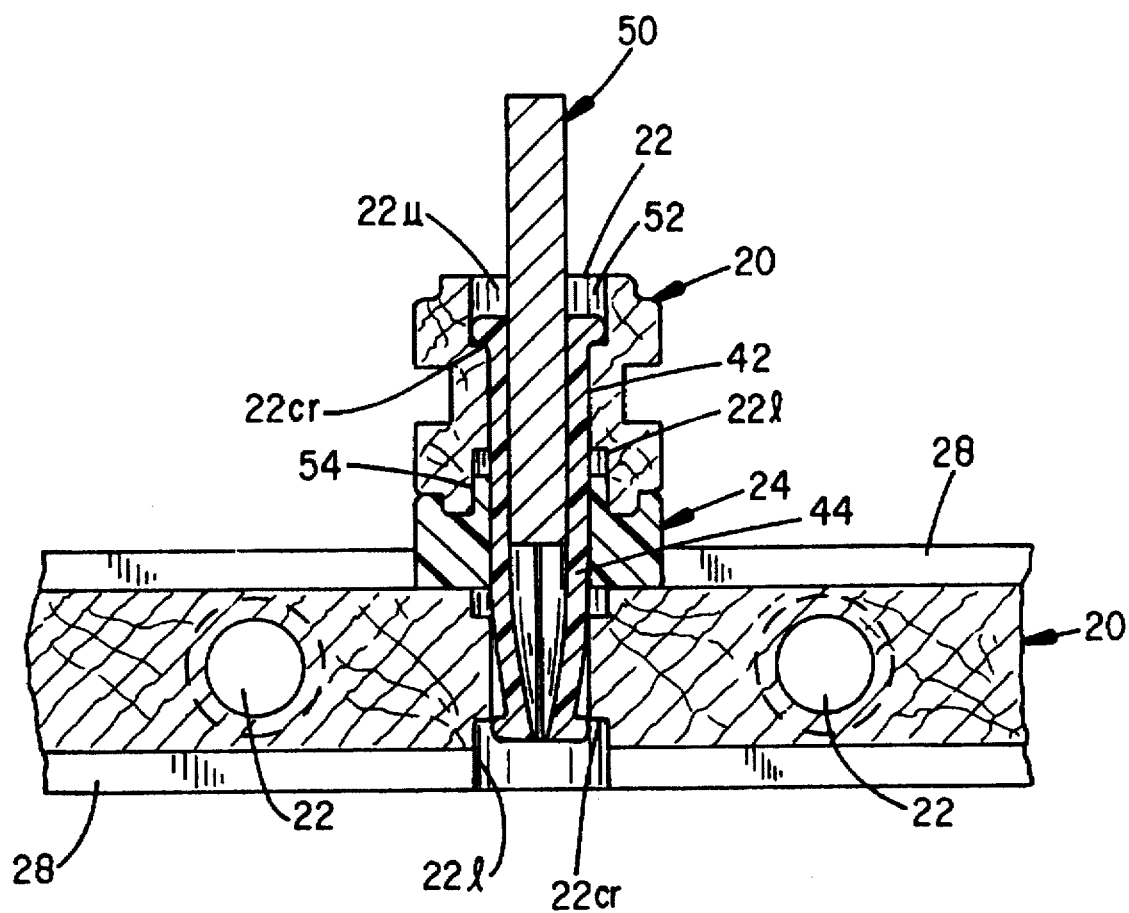
Figure 4C:
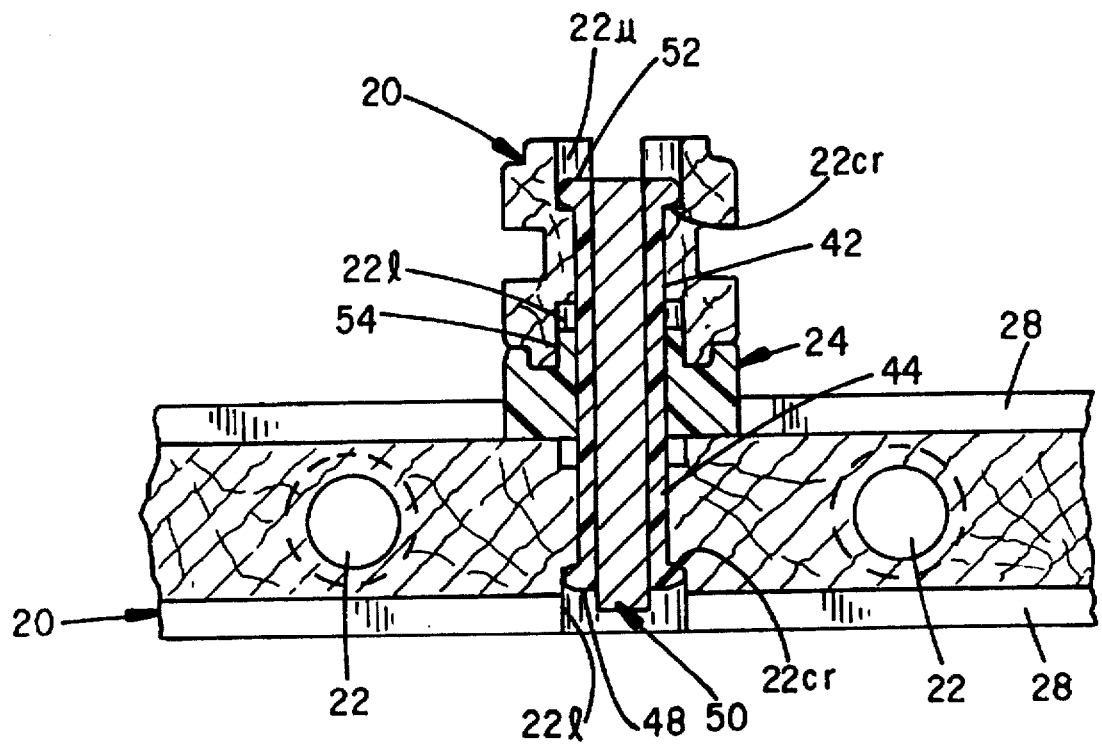

Turning now to FIGS. 4A–4C, illustrated is the progression required to be undertaken to rigidly affix a pair of adjacent construction elements 20 in accordance with the first preferred embodiment of the present invention. With reference first to FIG. 4A, shown is the step of aligning the positioning element 24 in between adjacent construction elements 20 such that one connecting bore 22 in each construction element 20 is coaxially aligned with the connecting bore 26 of the positioning element 24. Shown also is the coaxial alignment of the partially expandable tubular member 40 and the dowel member 50 with the connecting bores 22,26,22. It should be noted with particularity at this point that each connecting bore 22 is further distinguished as having a middle portion 22m, an upper portion 22u, a lower portion 22l, as well as having compression ridges 22cr which extend between the middle portion 22m and the upper portion 22u and between the middle portion 22m and the lower portion 22l. As can be seen, the middle portion 22m has a decreased internal diameter relative to the upper and lower portions 22u, 22l, while the middle portion 22m has substantially the same internal diameter as the connecting bore 26 of the positioning element 24. The upper alignment barrel 54 is dimensioned to be received at least partially within the lower portion 22l of connecting bore 22 of the upper construction element 20, while the lower alignment barrel (not shown) is similarly dimensioned to be received within the upper portion 22u of the lower construction element 20. The partially expandable tubular member 40 has a smaller external diameter than the internal diameter of the upper and lower portions 22u, 22l of connecting bore 22 which effectively provides a user the ability to quickly and easily insert and withdraw the partially expandable tubular member 40 into and out of the coaligned connecting bores 22,26,22. Moreover, as will be mentioned in greater detail below, each lip member 48 extends angularly away from each leaf member 46 so as to matingly engage with the compression ridges 22cr of the construction element 20 when the dowel member 50 is inserted into the internal lumen (not shown) of the tubular member 40 to thereby rigidly connect the upper and lower construction elements 20 together. Importantly, the angled disposition of each lip member 48 relative to each leaf member 46 also permits the tubular member 40 to be easily removed from the connecting bores 26,24,26 when the dowel member 50 has been withdrawn from within the tubular member 40.

Turning now to FIG. 4B, shown is the next assembly step of the improved construction system of the present invention. In this stage, the adjacent construction elements 20 are sandwiched against the top and bottom surfaces of the positioning element 24 such that the first alignment barrel 54 is engaged at least partially within the lower portion 22l of the connecting bore 22 of the uppermost construction element 20, the second alignment barrel (not shown) is similarly engaged at least partially within the upper portion 22u of the connecting bore 22 of the lowermost construction element 20, and the partially expandable tubular member 40 is fully inserted into the coaligned connection bores 22,26, 22 of the upper construction element 20, the positioning element 24, and the lower construction element 20, respectively. It can be further seen that, in this fully inserted yet non-expanded state, the annular lip member 52 extending radially outward from the non-expanding portion 42 rests against the uppermost compression ridge 22cr of the connecting bore 22 of the uppermost construction element 20, while the plurality of lip members 48 attached to the expanding portion 44 have an at-rest external diameter which is substantially equal to the internal diameter of the middle portion 22m. Once again, this at-rest external diameter of the lip members 48 is especially important because it allows an individual to insert and remove the partially expandable tubular member 40 into and from the adjacently positioned construction elements 20 with relative ease and without the need for supplemental tools.

Another significant feature of the partially expanding tubular member 40 of the present invention is that the lip members 48 extend radially outward from the expanding portion 44 in a slightly angled fashion. The slightly angled at-rest disposition of the lip members 48 relative to the expanding portion 44 takes advantage of the construction of the compression ridges 22cr to enable the partially expandable tubular member 40 to always navigate through and past the compression ridge 22cr, even if the expanding portion 44 loses resiliency through repeated use such that the at-rest external diameter around the lip members 48 increases slightly. This is due to the construction of the compression ridges 22cr, which are essentially annular transition areas which extend radially to form an angled ramp between the larger diameter upper and lower portions 22u, 22l and the middle portion 22m which has a relatively reduced diameter.

With reference now to FIG. 4C, shown is the improved construction system of the present invention with the locking mechanism completely engaged to thereby rigidly affix the adjacent construction elements 20 about positioning element 24. Note that the full insertion of the dowel member 50 into the partially expandable tubular member 40 forces the individual flexible expansion leaves 46 radially outward such that the external diameter of the expanding portion 44 is substantially equal to the non-expanding portion 42. More importantly, it should be noted with particularity that the full insertion of the dowel member 50 into the partially expanding tubular member 40 forces the lip members 48 of the expanding portion 44 radially outward past the longitudinal plane of the middle portion 22m and into direct and flush contact with the lowermost compression ridge 22cr of the connecting bore 22 of the lowermost construction element 20. This flush positioning of the lip members 48 against this compression ridge 22cr render it virtually impossible to withdraw the partially expandable tubular member 40 while the dowel member 50 is disposed fully therewithin. The aforementioned locking arrangement is effective in binding the construction elements 20 in close proximity with one another such that the fixed construction elements 20 will experience neither lateral nor rotational displacement.

Figure 5:
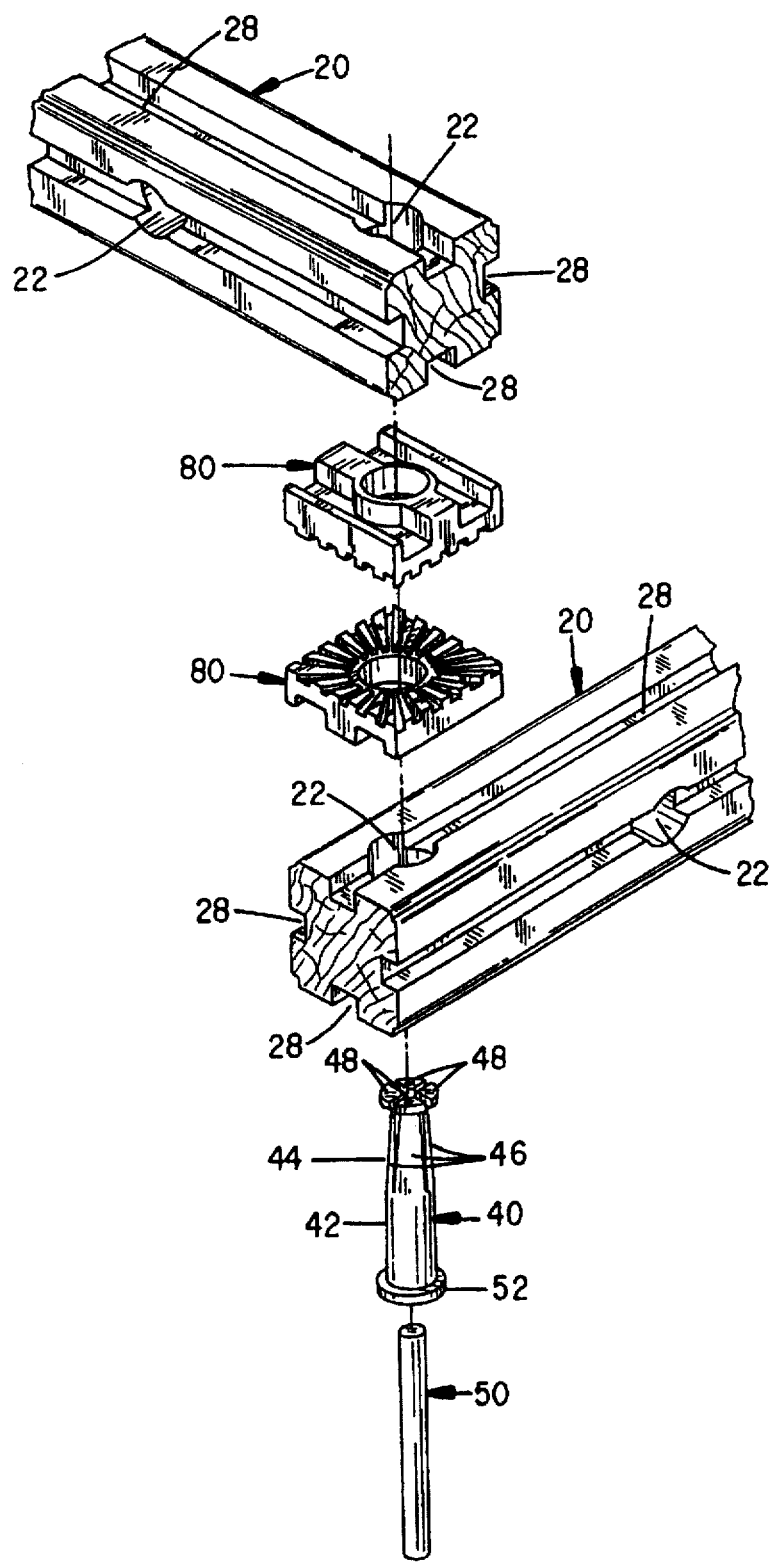
FIG. 5 is an exploded perspective view of a second preferred embodiment of the apparatus of the present invention, including a first construction element, a second construction element, a second preferred positioning element, and a partially expandable locking mechanism.
Figure 6A:
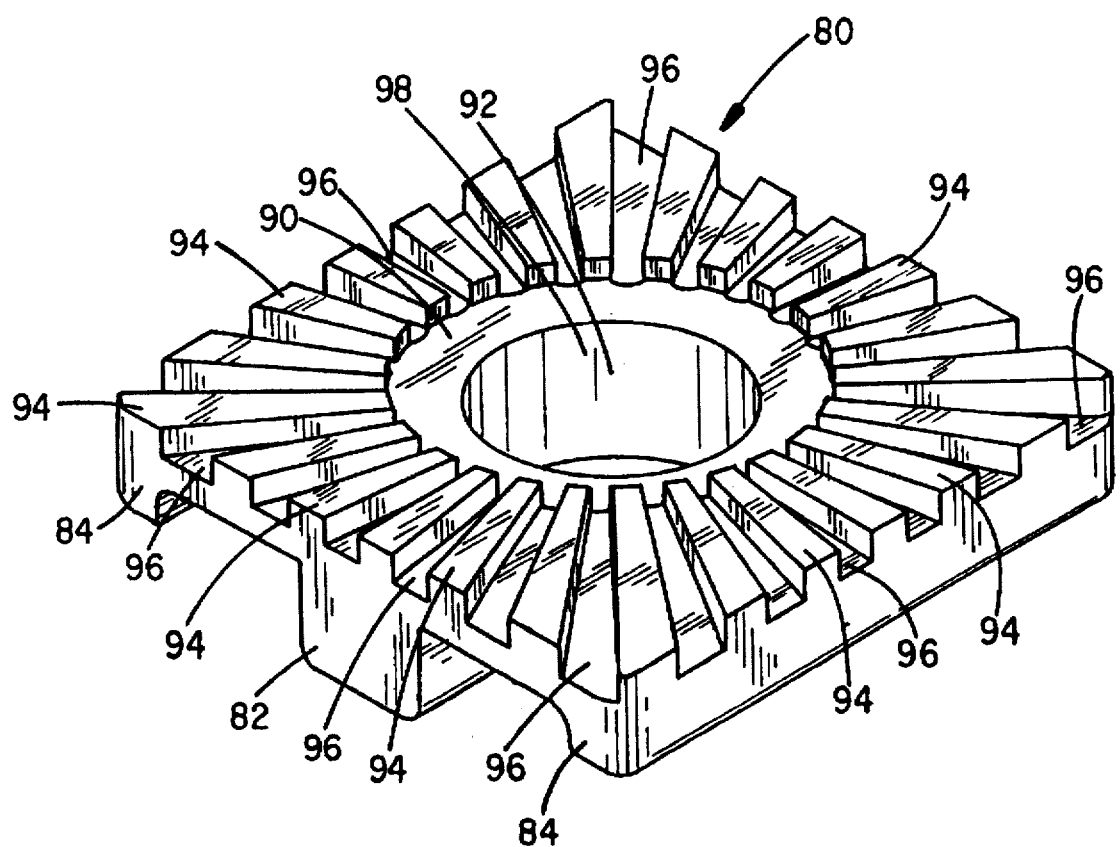
FIG. 6A is an enlarged perspective view of the second preferred positioning element shown in FIG. 5.
Figure 6B:
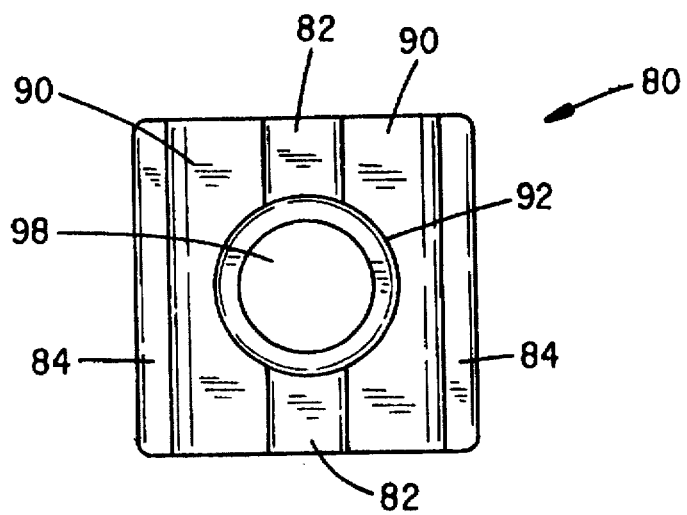
FIG. 6B is a bottom plan view of the positioning element shown in FIG. 6A.
Figure 6C:
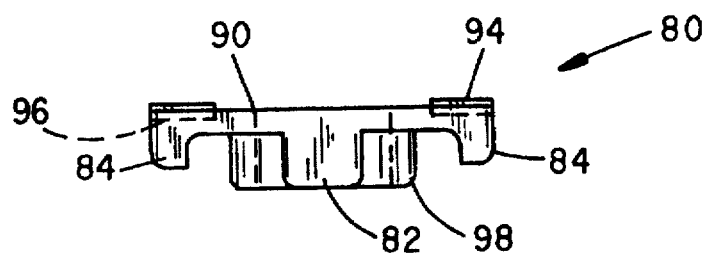
FIG. 6C is a side profile view of the positioning element shown in FIG. 6A.
Figure 6D:
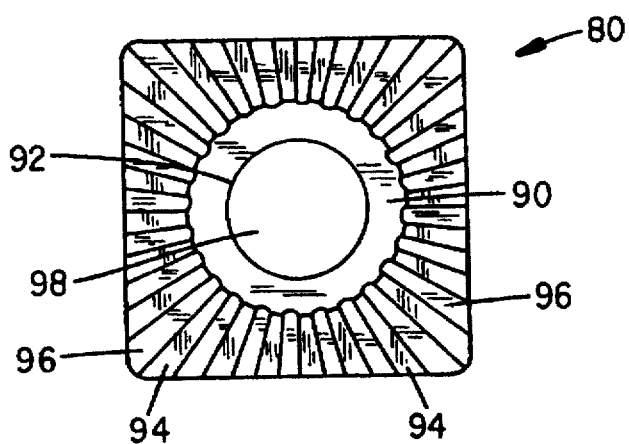
FIG. 6D is a top plan view of the positioning element shown in FIG. 6A.

Referring now to FIGS. 5 and 6A–6D, shown is the improved construction system of the present invention equipped with a pair of mutually engaging positioning elements 80 in accordance with a second preferred embodiment. Other than the use of the pair of positioning elements 80, all other components of the present invention shown in FIG. 5 are identical those disclosed and discussed in earlier with reference to FIGS. 1–4. For this reasons a repeat discussion regarding the fabrication and features of the construction elements 20, the partially expandable tubular member 40, the dowel member 50, and the alignment barrel 92 will not be undertaken at this time. Focusing instead on the pair of positioning elements 80, each positioning element 80 comprises a generally planar base member 90, a generally cylindrical alignment barrel 92, a plurality of pairs of radially extending engagement ribs 94 disposed on a first surface of the base member 90, a plurality of pairs of radially extending engagement grooves 96 disposed between the plurality of pairs of radially extending engagement ribs 94, a pair of engagement ribs 82 disposed on a second surface of the base member 90, and a pair of lateral support arms 84.

The generally cylindrical alignment barrel 92 is formed at the approximate center of the planar base member 90 to define a connecting bore 98 therewithin. The engagement ribs 94 extend in a raised fashion from the plane of the base member 90, while the engagement grooves 96 are disposed therebetween and below the plane of the base member 90. The pair of engagement ribs 82 disposed on the second surface of the base member 90 and accompanying lateral support arms 94 are identical in construction and function as the second pair of engagement ribs 68 and second pair of lateral support arms 70 illustrated in FIGS. 2–4 and, as such, the reader may refer to the above text for a more thorough description. Generally speaking, however, the engagement ribs 82, lateral support arms 94, and alignment barrel cooperate to rigidly position each positioning element 80 on a respective construction element 20.

The key aspect of this second preferred embodiment is the mating relationship capable between each of the pair of positioning elements 80 after each positioning element 80 has been coupled to a particular connecting bore 22 of each construction element 20. More specifically, the benefit of this embodiment stems from the fact that the adjacent construction elements 20 may be selectively adjusted relative to one another due to the mating relationship between the plurality of engagement ribs 94 and engagement grooves 96 of each respective construction element 80. Other than this feature of variable positioning, the positioning elements 80 still employ the use of the partially expandable tubular member 40 and the accompanying dowel member 50 in order to rigidly lock the construction elements 20 in the particular positional relationship obtained through the use of positioning elements 80.

Thus, the present invention is ingeniously simple, yet remarkably effective in rigidly joining construction elements to one another. In so doing, the present invention solves the various drawbacks found in the prior art by providing an apparatus and method for rigidly joining construction elements to one another which is quick and easy to work with and manipulate. The present invention requires no supplemental tools, clamps, or braces for assembly and/or disassembly which make the system inexpensive to implement both in terms of reduced labor costs and reduced overhead. The present invention will not damage or mar the aesthetic appearance of the construction elements in that it does not require the use of traditional fasteners, such as glue, nails, screws, etc . . . to rigidly affix the construction elements. In addition, the integrally and rigidly constructed positioning elements may be constructed to position the adjacent construction elements in any number of predetermined angles and configurations so as to eliminate the need for precise manual positioning and to reduce the likelihood of misalignment. Furthermore, the present invention may be constructed from any number of suitable resilient components, such as wood, metal, plastics, and ceramics such that the components are capable of being reused, recycled, and repositioned without damaging the structural integrity thereof. Finally, the present invention is versatile, allowing a person to construct any number of different rigid structures with minimal time investment.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Figure 7A:
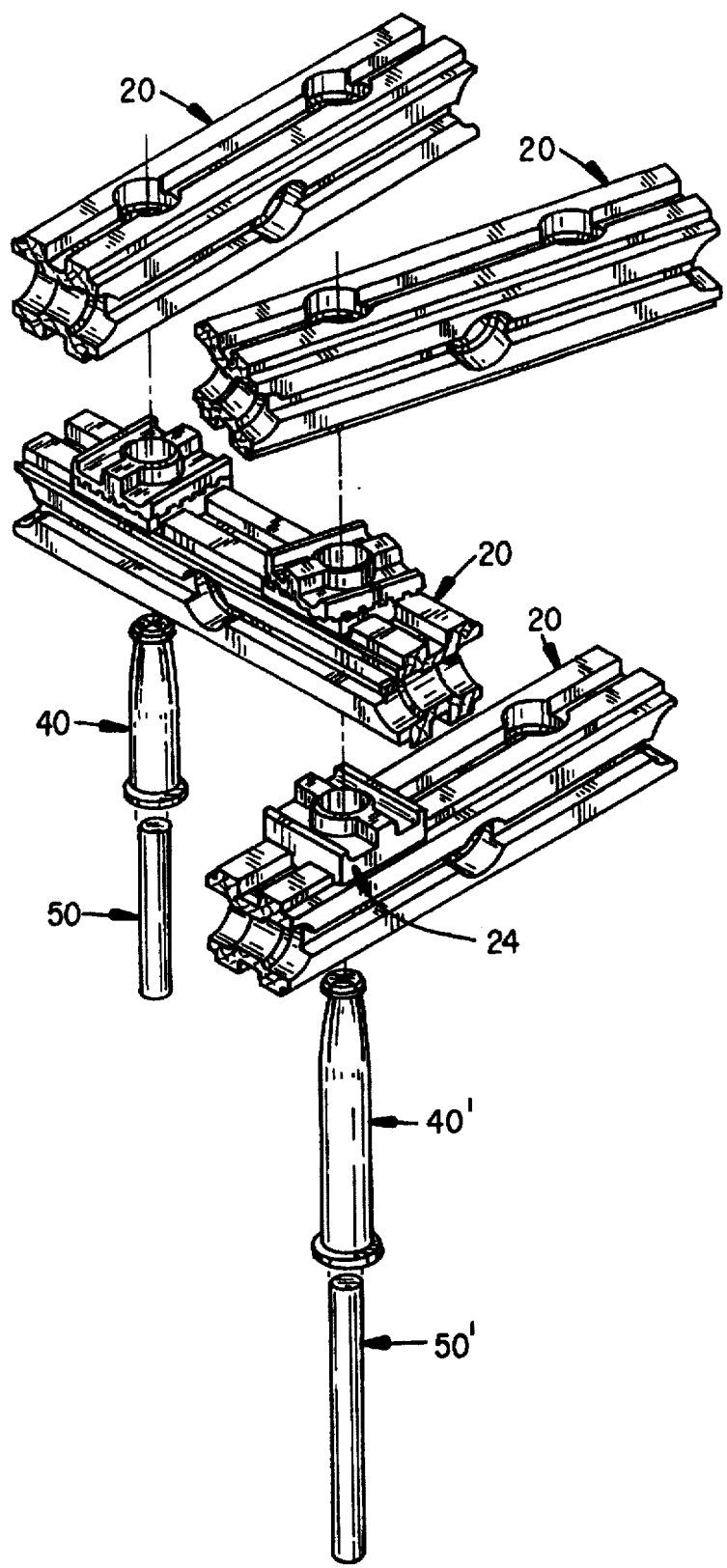
FIG. 7A and 7B are partially exploded perspective views illustrating the feature of providing partially expandable locking mechanism of varying length to pass through multiple levels of constructing elements.
Figure 7B:
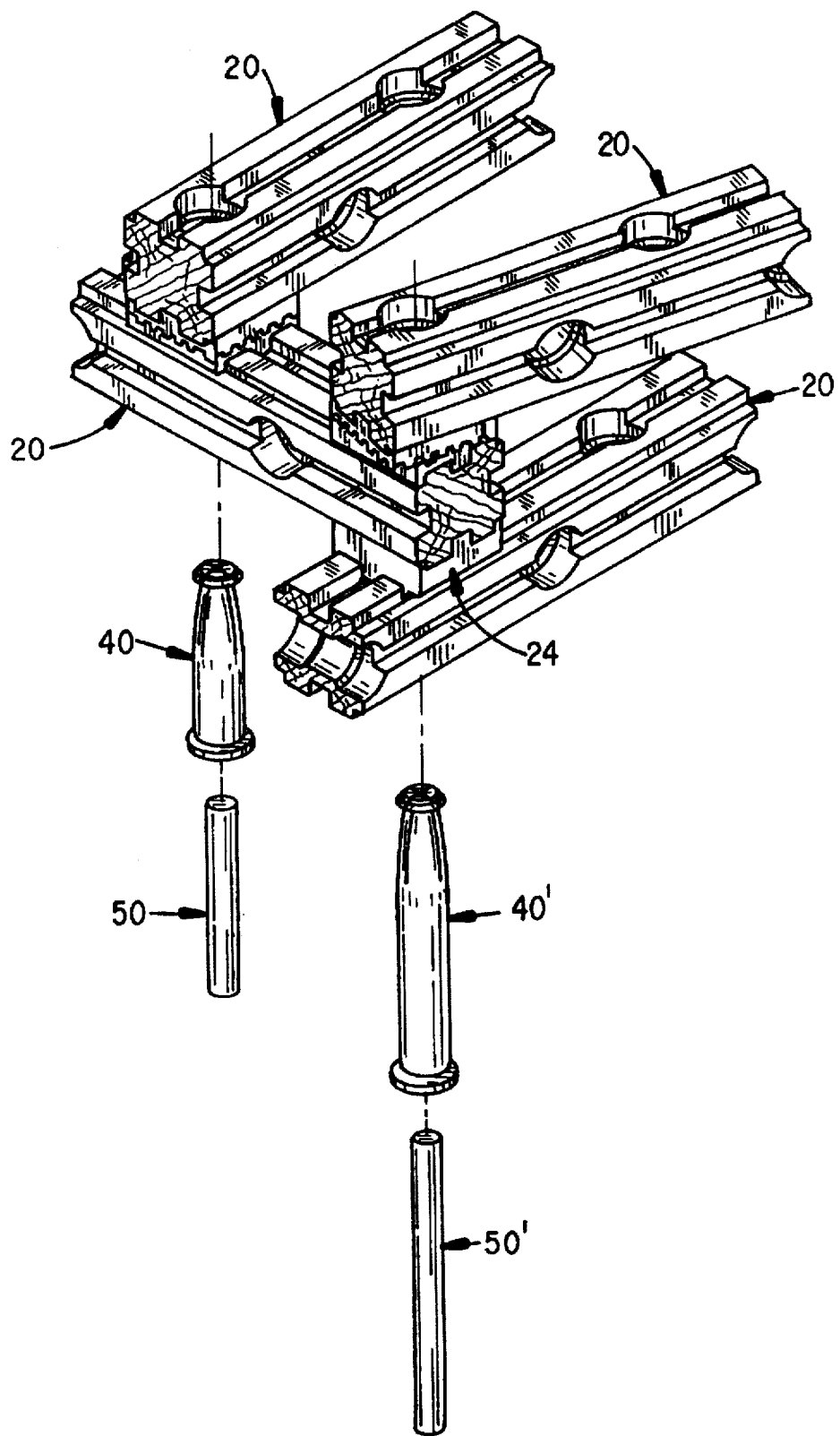

For instance, with reference to FIGS. 7A and 7B, although the partially expandable tubular member 40 and dowel member 50 of the present invention were described above as being capable of rigidly locking a pair of adjacent construction elements 20 to one another, it is to be understood that locking means of increased length may be produced to rigidly lock together more than two construction elements, such as partially expandable tubular member 40' and dowel member 50' which are designed to rigidly lock three construction elements 20.

In addition, the various connecting bores discussed above need not be perpendicular to the surfaces of the particular construction elements or positioning elements. Rather, the connecting bores may be disposed in any number of angled configurations through the construction elements. Similarly, the physical arrangement between the various engagement grooves, engagement ribs, and lateral support arms may be altered or modified in any number of ways without departing from the scope of the present invention. For example, while each engagement rib 32 of positioning element 24 is disposed perpendicular to one another in the embodiment shown in FIGS. 1–4C, it is to be understood that positioning element 24 could be manufactured with engagement ribs 32 which vary from the perpendicular arrangement shown which would, of course, alter the positioning of the construction elements 20 relative to one another.

Furthermore, the particular composition of the construction elements, positioning elements, and locking elements may include any suitable material, including but not limited to wood, metals, plastics, and ceramics. The present invention may also be prefabricated in any number of different sizes to construct a plurality of rigid structures.

What is claimed is:

1. A system for rigidly joining a first construction element to a second construction element, comprising:

a first construction element and a second construction element each having a connecting bore formed therethrough, a first pair of engagement grooves extending laterally away from a first end of said connecting bore, and a second pair of engagement grooves extending laterally away from a second end of said connecting bore;

positioning means for positioning said first construction element relative to said second construction element, said positioning means having a connecting bore formed therethrough, a first pair of engagement ribs extending laterally away from a first end of said connecting bore, and a second pair of engagement ribs extending laterally away from a second end of said connecting bore, said positioning means being disposed between said first and second construction elements such that said connecting bore of said positioning means is substantially coaxial with said connecting bores of said first and second construction elements, said positioning means being disposed between said first and second construction elements such that said first pair of engagement ribs are engagedly coupled within said second pair of engagement grooves of said first construction element and said second pair of engagement ribs of said positioning means are engagedly coupled within said first pair of engagement grooves of said second construction element; and partially expandable locking means for rigidly locking said first construction element relative to said second construction element, said partially expandable locking means being disposed at least partially within said connecting bore of said first construction element, at least partially within said connecting bore of said second construction element, at least partially within said connecting bore of said positioning means, and partially expanded to thereby affix said first construction element in rigid relation to said second construction element.

2. The system as set forth in claim 1 and further, said locking means comprising a generally elongate expansion member having a first end and a second end, said second end being capable of radial expansion.

3. The system as set forth in claim 2 and further, said locking means comprising a generally cylindrical dowel member for causing said second end of said elongate expansion member to radially expand.

4. The system as set forth in claim 3 and further, said elongate expansion member comprising a generally cylindrical tubular member having a first end, a second end, a non-expanding portion extending between said first end and a junction point, and an expanding portion extending between said junction point and said second end, said non-expanding portion having a fixed external radius, said expanding portion comprising a plurality of flexible expansion leaves which curve radially inward from said junction point to said second end, wherein the introduction of said dowel member into said expanding portion forces said plurality of flexible expansion leaves into contact with said second construction element.

5. The system as set forth in claim 4 and further, said generally tubular member including an upper lip member extending radially outward from said upper portion of said tubular member for engagement with said first end of said connecting bore of said first construction element.

6. The system as set forth in claim 5 and further, said expanding portion of said generally cylindrical tubular member including a lip member extending angularly and radially away from each of said plurality of flexible expansion leaves for biasing said first and second construction elements together as said dowel member is introduced into said expanding portion.

7. The system as set forth in claim 1 and further, said connecting bores of said first and second construction elements comprising a first end portion, a second end portion, and a middle portion, said first end portion extending between said middle portion and said first end of said connecting bore, said second end portion extending between said middle portion and said second end of said connecting bore, said first and second end portions having generally the same radius, said middle portion having a smaller diameter than the diameter of said first and second end portions.

8. The system as set forth in claim 7 and further, said locking means comprising a generally elongate expansion member having a first end and a second end, said first end having a lip member for engagement with said first end portion of said connecting bore of said first construction element, said second end having a lip member for engagement with said second end portion of said connecting bore of said second construction element, and said second end of said elongate expansion member being capable of radially expanding so as to bias said first construction element towards said second construction element.

13

9. The system as set forth in claim 7 and further, said second surface of said positioning means including a rim portion extending generally perpendicularly from the plane of said connecting bore of said positioning means, said rim portion being dimensioned to engage with said first end portion of said connecting bore of said second construction element.

10. A system for rigidly joining a first construction element to a second construction element in a variety of predetermined angles, comprising:

a first construction element and a second construction element each having a connecting bore formed therethrough, a first pair of engagement grooves extending laterally away from a first end of said connecting bore, and a second pair of engagement grooves extending laterally away from a second end of said connecting bore;

first and second positioning means for positioning said first construction element relative to said second construction element, each of said first and second positioning means having a first generally planar surface, a second generally planar surface, and a connecting bore extending between said first and second generally planar surfaces, said first generally planar surface having a plurality of engagement ribs extending laterally away from said connecting bore, said second generally planar surface having a pair of engagement ribs for matingly engaging with said engagement grooves disposed within said first and second construction elements, said first and second positioning means being disposed between said first and second construction elements such that said connecting bores of said first and second positioning means are substantially coaxial with said connecting bores of said first and second construction elements and such that said plurality of engagement ribs of said first positioning means matingly engage with said plurality of engagement ribs of said second positioning means to selectively orient said first construction element in any of a variety of predetermined angles with respect to said second construction element; and partially expandable locking means for rigidly locking said first construction element relative to said second construction element, said partially expandable locking means being disposed at least partially within said connecting bore of said first construction element, at least partially within said connecting bore of said second construction element, at least partially within said connecting bore of said positioning means, and partially expanded to thereby affix said first construction element in rigid relation to said second construction element.

11. The system as set forth in claim 10 and further, said locking means comprising a generally elongate expansion member having a first end and a second end, said second end being capable of radial expansion.

12. The system as set forth in claim 11 and further, said locking means comprising a generally cylindrical dowel member for causing said second end of said elongate expansion member to radially expand.

13. The system as set forth in claim 12 and further, said elongate expansion member comprising a generally cylindrical tubular member having a first end, a second end, a non-expanding portion extending between said first end and a junction point, and an expanding portion extending between said junction point and said second end, said non-expanding portion having a fixed external radius, said expanding portion comprising a plurality of flexible expansion leaves which curve radially inward from said junction point to said second end, wherein the introduction of said dowel member into said expanding portion forces said plurality of flexible expansion leaves into contact with said second construction element.

14. The system as set forth in claim 13 and further, said generally tubular member including an upper lip member extending radially outward from said upper portion of said tubular member for engagement with said first end of said connecting bore of said first construction element.

15. The system as set forth in claim 14 and further, said expanding portion of said generally cylindrical tubular member including a lip member extending angularly and radially away from each of said plurality of flexible expansion leaves for biasing said first and second construction elements together as said dowel member is introduced into said expanding portion.

16. The system as set forth in claim 10 and further, said connecting bores of said first and second construction elements comprising a first end portion, a second end portion, and a middle portion, said first end portion extending between said middle portion and said first end of said connecting bore, said second end portion extending between said middle portion and said second end of said connecting bore, said first and second end portions having generally the same radius, said middle portion having a smaller diameter than the diameter of said first and second end portions.

17. The system as set forth in claim 16 and further, said locking means comprising a generally elongate expansion member having a first end and a second end, said first end having a lip member for engagement with said first end portion of said connecting bore of said first construction element, said second end having a lip member for engagement with said second end portion of said connecting bore of said second construction element, and said second end of said elongate expansion member being capable of radially expanding so as to bias said first construction element towards said second construction element.

18. The system as set forth in claim 16 and further, said second generally planar surface of said first and second positioning means including a rim portion extending generally perpendicularly from the plane of said connecting bore of said first and second positioning means, said rim portion being dimensioned to engage with said first end portion of said connecting bore of said first and second construction element.

19. A method of rigidly joining a first construction element to a second construction element, comprising the steps of:

(a) providing a first and a second construction element, said first and second construction elements each having a connecting bore extending between a first surface and a second surface, and at least one engagement groove formed in one of said first and second surfaces;

(b) providing first positioning means having a connecting bore extending between a first surface and a second surface, a first pair of engagement ribs extending laterally away from a first end of said connecting bore along said first surface, and a second pair of engagement ribs extending laterally away from a second end of said connecting bore along said second surface;

(c) providing partially expandable locking means for locking said first and second construction elements in fixed relation about said positioning means;

(d) arranging said positioning means between said first and second construction elements such that said connecting bore of said positioning means is substantially coaxial with said connecting bore of said first construction element and said connecting bore of said second construction element, said first pair of engagement ribs is cooperatively coupled with said at least one engagement groove in said first construction element;

(e) arranging said locking means so as to extend at least partially within said connecting bores of said first and second construction elements and at least partially within said connecting bore of said positioning means; and (f) partially expanding said partially expandable locking means to affix said first construction element in fixed and rigid relation to said second construction element.

20. The method as set forth in claim 19 and further, said step (b) comprising the further sub-step of providing second positioning means having a connecting bore extending between a first surface and a second surface, a first pair of engagement ribs extending laterally away from a first end of said connecting bore along said first surface, and a second pair of engagement ribs extending laterally away from a second end of said connecting bore along said second surface.

21. The method as set forth in claim 20 and further, said step (d) comprising the further sub-steps of: (i) matingly engaging said second pair of engagement ribs of said second positioning means within said at least one engagement groove of said second construction element; and (ii) selectively engaging said second pair of engagement ribs of said first positioning means with said first pair of engagement ribs of said second positioning means to thereby selectively orient said first construction element relative to said second construction element.

* * * * *